United States Patent [15] 3,665,276
Fujii et al. [45] May 23, 1972

[54] SPEED CONTROLLER FOR PRIME MOVER

[72] Inventors: Masaru Fujii; Kazuo Sagara; Shuichi Isomura, all of Nagasaki-ken, Japan

[73] Assignee: Mitsubishi Jukogyo Kabushiki Kaisha, Tokyo, Japan

[22] Filed: Mar. 6, 1969

[21] Appl. No.: 804,971

Related U.S. Application Data

[63] Continuation-in-part of Ser. No. 766,717, Oct. 11, 1968, abandoned, and a continuation-in-part of Ser. No. 766,718, Oct. 11, 1968, abandoned.

[52] U.S. Cl................................................318/318, 318/329
[51] Int. Cl................................................................H02p 5/06
[58] Field of Search....................318/20.427, 318, 314, 319, 318/320, 6, 7; 310/95

[56] References Cited

UNITED STATES PATENTS

| | | | |
|---|---|---|---|
| 2,694,900 | 11/1954 | Brandau | 60/39.28 T |
| 1,578,971 | 3/1926 | Fleischmann | 319/319 X |
| 2,298,977 | 10/1942 | Silber et al. | 318/319 X |
| 2,569,287 | 9/1951 | Burgwin et al. | 318/319 X |
| 3,076,906 | 2/1963 | Simo | 310/95 X |
| 3,259,819 | 7/1966 | Heiser | 318/20.427 X |

FOREIGN PATENTS OR APPLICATIONS 154,527   5/1932   Switzerland ........................318/349

Primary Examiner—J. D. Miller
Assistant Examiner—Robert J. Hickey
Attorney—McGlew and Toren

[57] ABSTRACT

A speed controller for a prime mover includes a permanent magnet rotor, rotated at a speed corresponding to the speed of the prime mover, and an annular stator provided with an output winding connected, through an amplifier, to a throttle or the like controlling the speed of the prime motor. The rotation of the permanent magnet rotor developes a voltage in the output winding at a first frequency corresponding to the speed of the prime mover. Speed setting means are coupled with the stator to develop, in the output winding, a voltage at a second frequency corresponding to a desired speed of the prime mover as set by the speed setting means. The output winding thus supplies to the throttle or the like a control voltage at a frequency which is the difference between the first and second frequencies. In one embodiment of the invention, the annular stator is rotatable independently of the permanent magnet rotor, by a motor whose speed is controlled in accordance with a setting of the speed setting means. In another embodiment of the invention, an input winding on the stator is supplied by an oscillator at a frequency set by the speed setting means.

1 Claims, 6 Drawing Figures

INVENTOR
MASARU FUJII
KAZUO SAGARA
SHUICHI ISOMURA
BY
ATTORNEYS

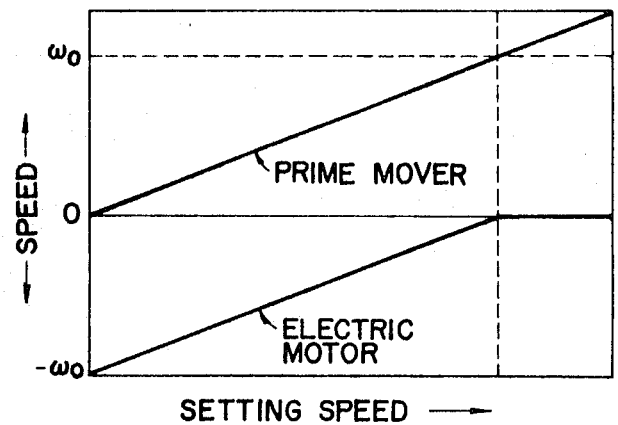
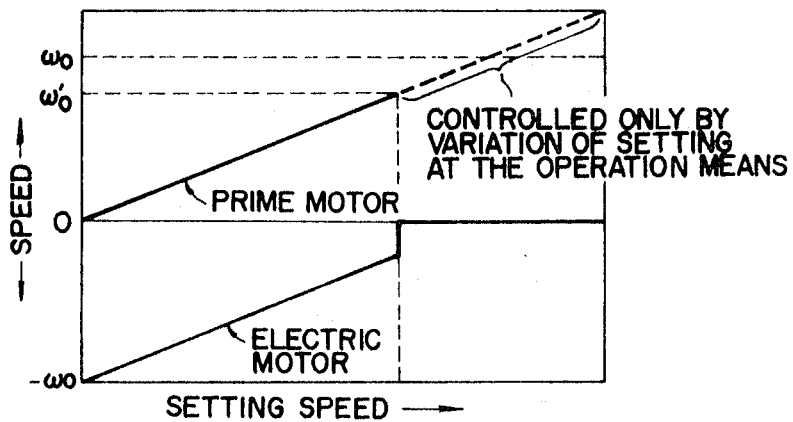

SPEED CONTROLLER FOR PRIME MOVER

CROSS REFERENCE TO RELATED APPLICATIONS

This application is a continuation-in-part of application Ser. No. 766,717, filed Oct. 11, 1968, now abandoned for "SPEED CONTROLLER FOR PRIME MOVER," and of application Ser. No. 766,718, filed Oct. 11, 1968, now abandoned for "SPEED CONTROLLER."

BACKGROUND OF THE INVENTION

There has been a recent trend, particularly in electric power systems, to replace conventional hydraulic and mechanical governors by more versatile electric governors. To this end, both domestic and foreign manufacturers have been interested in providing electric governors for practical use. As a result, there has been an urgent demand for electric governors available at low cost while still having excellent performance characteristics.

Up to the present, however, there has not been proposed a governor, for prime movers, which can effect a wide range speed control, for example, from start-up to rated speed, as well as speed control in the vicinity of the rated speed, simultaneously and with the necessary accuracy.

For the purpose of controlling the speed of the prime mover in the vicinity of rated speed, there has been proposed an electric governor of the type shown in FIG. 1. In this governor, a permanent magnet generator 1 generates, in a coil or winding 3, a voltage having a frequency proportional to the speed of a prime mover 2. The frequency is discriminated (frequency-voltage transformation) in a resonant circuit 4, and the discriminated output is amplified by an amplifier 5 to control prime mover 2 through a control valve or throttle 6. Since resonant circuit 4 is limited in its working range, the speed control range for the prime mover 2 is limited, usually being about ± 10 percent of the rated speed.

Existing governors for use in wide range speed control are generally of an electric type including a tachometer generator, a pulse signal generator, or the like being utilized as a detecting means. These governors are unstable in their operation in the range from start-up to about 10 percent of the rated speed, and are unable to control the speed of the prime mover over the entire range. In addition, the resolution of the speed change is decreased in inverse proportion to an increase in the working range, and a highly accurate speed control, in the vicinity of the rated speed, is not possible. Furthermore, an electric governor including a resonant circuit has a very narrow working range and is not applicable for wide range speed control. Generally speaking, there is no governor, for prime movers, which can control the speed of a prime mover operating at a rated speed with an acceptable accuracy and which is also capable of performing so-called wide range speed control from start-up to the rated speed.

SUMMARY OF THE INVENTION

This invention relates to speed controllers for prime movers and, more particularly, to a novel speed controller capable of controlling the speed of the prime mover, with acceptable accuracy, over the range from start-up to rated speed as well as in the vicinity of the rated speed.

In accordance with the invention, speed control in the range from start-up to rated speed, of a prime mover, or in the vicinity of rated speed of the prime mover, is effected with a high degree of precision by a speed control arrangement in which the difference between the angular velocity of the rotor of a permanent magnet generator, for speed detection of the prime mover, and the angular velocity of a rotating ring rotating at an annular velocity set by a speed setting command given beforehand, is used to develop, in an output winding on the ring, a frequency corresponding to the rated speed. The invention is thus directed to a speed controller, for prime movers, capable of controlling a wide variety of machines such as, for example, the governors for steam turbines, gas turbines, water wheel generators and diesel engines, as well as being capable of use as a governor for electric motors, pumps, blowers and other industrial rotary machines.

In an alternative embodiment of the invention, a rotating magnetic field is formed in the primary winding of an annular stator and corresponding to a given speed setting. The stator is part of a permanent magnet generator which includes a permanent magnet rotor for the speed detection of the prime mover. The difference between the angular velocity of the rotor and the angular velocity of the rotating magnetic field is derived from a secondary winding on the stator as a certain frequency corresponding to the rated speed.

Thus, in accordance with the invention, a speed controller for a prime mover having a control throttle includes a permanent magnet generator comprising a rotary permanent magnet and an annular stator. One of the magnet or the stator is coupled to the prime mover for rotation by the latter at a speed proportional to that of the prime mover to develop, in the stator, a voltage at a frequency corresponding to the speed of the prime mover. Control means controlling the control throttle are connected to an output winding on the stator, and speed setting means are operatively coupled to the other of the rotor or the stator and are operable to develop, in the stator, a voltage at a frequency corresponding to a speed set by the speed setting means. Thereby, there is developed in the output winding a control voltage at a frequency equal to the difference between the two mentioned frequencies. This differential frequency is applied, through an amplifier or the like, to control the throttle of the prime mover.

An object of the invention is to provide an improved electric governor for prime movers controlled by a throttle.

Another object of the invention is to provide such a governor which effects accurate speed control not only over the range from start-up to rated speed of the prime mover, but also in the vicinity of the rated speed.

A further object of the invention is to provide such a governor which includes a permanent magnet rotor and an annular stator associated with the rotor, with the rotor being driven at a speed corresponding to the speed of the prime mover, to develop in the stator a voltage at a frequency corresponding to the prime mover speed.

Another object of the invention is to provide such an electric governor in which there is developed, in the stator, a voltage at a frequency corresponding to a speed preselected by a speed setting mechanism.

A further object of the invention is to provide such an electric governor including an output winding coupled to the stator and having developed therein a voltage at a frequency which is equal to the difference of the two frequencies.

Another object of the invention is to provide such an electric governor in which the stator is rotated, independently of the permanent magnet rotor, at a speed corresponding to a desired speed as set by a speed setting means.

A further object of the invention is to provide such a governor in which an oscillator or the like develops, in an input winding on a stationary stator, a rotating magnetic field which rotates at a desired speed or angular velocity as set by a speed setting means.

For an understanding of the principles of the invention, reference is made to the following description of typical embodiments thereof as illustrated in the accompanying drawings.

BRIEF DESCRIPTION OF THE DRAWINGS

In the drawings:

FIGS. 3 and 4 are diagrams graphically illustrating the performance of the speed controller shown in FIG. 2;

DESCRIPTION OF THE PREFERRED EMBODIMENTS

Figure 1:
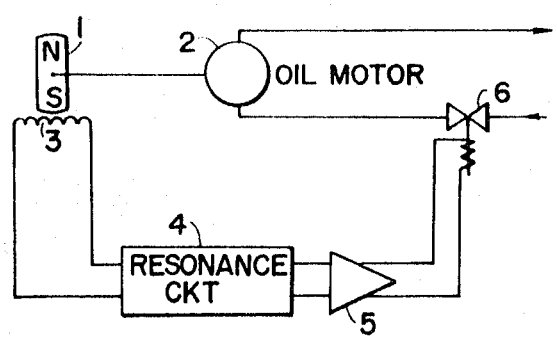
FIG. 1 is a schematic diagram of a known type of electric governor.
Figure 2:
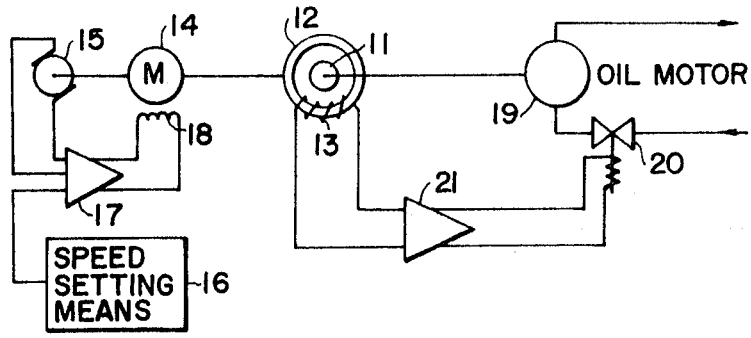
FIG. 2 is a schematic diagram of a speed controller, for a prime mover, in accordance with the present invention.

Referring to FIG. 2, a permanent magnet or electro-magnetic rotor 11, of a conventional construction, is surrounded by a rotating ring or "stator" 12 which is rotated independently of rotor 11. A coil 13 is wound around ring 12 for frequency detection. A D.C. or A.C. motor 14 is directly coupled to ring 12 to rotate the same, so that the angular velocity or ring 12 can be controlled. The shaft or motor 14 is directly coupled to the shaft of a tachometer generator 15, whereby generator 15 will produce a voltage proportional to the angular velocity of ring 12.

A speed setting means is indicated at 16, and sets a voltage corresponding to a desired angular velocity or speed of a prime mover 19 described more fully hereinafter. On the output side of speed setting means 16, there is connected an amplifier 17 for amplifying the difference between the voltage produced by tachometer generator 15 and the voltage at the output of speed setting means 16, to a value sufficient to provide a current flow through the field winding 18 of motor 14. This field winding is connected to the output of amplifier 17, and controls the speed of motor 14.

As a result, there is produced, in output winding 13, a voltage having a frequency that corresponds to the difference between the angular velocities of rotor 11 and motor 14. The rotor 11 is connected to the fluid powered prime mover 19, for example, and such coupling may be effected either directly or indirectly, as by electrically synchronizing the rotation of rotor 11 with the prime mover. The motive fluid for prime mover 19 is supplied through a control valve 20 for regulating the flow rate. In turn, control valve 20 is connected with the output of an amplifier 21 whose input is connected to coil 13, amplifier 21 amplifying the output of winding 13 to a magnitude sufficient to operate the control throttle or valve 20. The operation of the embodiment of the invention shown in FIG. 2 will now be described. Assume first that a command is given to amplifier 17 by speed setting means 16 so that a desired value of the speed of prime mover 19 is set at $\omega_1$. As a result, and through the medium of amplifier 17, exciting winding 18 and tachometer generator 15, motor 14 is caused to operate at a speed of $\omega_0-\omega_1$, where $\omega_0$ is a rated speed. If, at this time, the speed of prime mover 19 is equal to $\omega_1$, the speed of motor 14 relative to the speed of rotor 11 will be $\omega_1 + (\omega_0 - \omega_1) = \omega_0$, and a voltage at a frequency $f_0$, corresponding to $\omega_0$, will be produced in output winding 13. Amplifier 21 serving as the operator of the electric governor discriminates the frequency on the basis of the frequency $f_0$, and produces a voltage $\Delta V$ which is proportional to the frequency deviation $\Delta f$ from the value $f_0$. However, in this case $\Delta f = 0$, so the electric governor does not give any operating signal for varying the output of prime mover 19. In other words, the system is maintained in an equilibrium state.

If the speed of prime mover 19 changes, due to any disturbance, to $\omega_2$ ( $\neq \omega_1$), the speed of motor 14 relative to rotor 11 will be $\omega_2 + (\omega_0 - \omega_1) = \omega_0 + (\omega_2 - \omega_1)$. There is generated in winding 13 a voltage having a frequency $f_0 + (f_2 - f_1)$ corresponding to $\omega_0 + (\omega_2 - \omega_1)$, and, from the operating means 21 of the electric governor there is produced a voltage $\Delta V_{12}$ proportional to the frequency $\Delta f = f_2 - f_1$. Thereby, control valve or throttle 20 is regulated until the speed $\omega_2$ of prime mover 19 is equal to the command speed $\omega_1$.

When prime mover 19 is inoperative, the speed setting means 16 should indicate a preset prime mover speed of $\omega = 0$, and therefore motor 14 will run in the reverse direction at the speed $\omega_0 - 0 = \omega_0$, or at a rated or maximum speed. As the setting of speed setting means 16 is increased from 0, in order to start-up prime mover 19, a deviation of the angular velocity is caused by the variable $\Delta\omega$. Thus, a voltage of a frequency ($f_0 - \Delta f$) is produced in winding 13, and control valve 20 is adjusted so that the rpm of the prime mover 19 can be increased.

When the command speed of speed setting means 16 has reached a value $\omega_0$, motor 14, having a speed of $\omega_0 - \omega_0 = 0$ stops, and the speed of the prime mover becomes $\omega_0$, in an equilibrium state.

In this equilibrium state, motor 14 takes no part in the speed governing, and the electric governor detects the speed $\omega_0$ of the prime mover and functions exactly in the same manner as conventional governors. The relations mentioned above are illustrated in FIG. 3 wherein actual speeds are plotted with respect to speed setting values.

It can happen that the speed of motor 14 is so small that it becomes unstable in the vicinity of the rated speed $\omega_0$ of the prime mover. In such a case, it is possible to set the operating means 21 to a value $f_0'$ which is less than $f_2$ by a value corresponding to the controlable allowable speed of the operating means 21, for example, about $\pm 12$ percent, and to stop motor 14 when the speed of prime mover 19 has reached the value $\omega_0'$ which is equivalent to the frequency $f_0'$.

In the region where the speed of prime mover 19 is greater than $\omega_0'$, the speed control may be accomplished, in the vicinity of the rated speed, by varying the above setting, as graphically illustrated in FIG. 4. In FIG. 4, as in FIG. 3, the abscissa represents the speed setting and the ordinate represents the speeds of the prime mover or the motor.

While the embodiment of the invention shown in FIG. 2 has been described as if rotor 11 is driven directly by the prime mover and rotating ring 12 is driven directly by motor 14, it is also possible that rotor 11 may be directly coupled to motor 14 and rotating ring 12 to prime mover 19. It will thus be clear that numerous modifications are possible without departing from the principles of the invention.

As described above, the speed controller shown in FIG. 2 comprises means for revolving the rotor element or the stator element, which is surrounded by an output winding, at a speed proportional to the speed of the prime mover being controlled. A motor drives the other element, and means are provided to vary the speed of this motor as desired. Means are provided for deriving the output voltage induced in the winding, including means for comparing a preset reference frequency with the frequency of the output voltage of the winding, and thereby controlling the throttle or other means for varying the input energy of the prime mover. With an arrangement of this type, the speed controller can always provide signals with a central frequency $f_0$ to the discriminating circuit of the electric governor. As a consequence, high S/N (signal/noise) ratio and sensitivity are obtained over the entire range from start-up to the rated speed of the prime mover.

Moreover, shifting from the high-zone speed control to the control of speed in the vicinity of the rated speed is made much smoother. The speed control in the vicinity of the rated speed can be accomplished with a high degree of accuracy, and a resonant circuit can be utilized in the wide-range speed control. Thereby, conventional governors are modified in a simple manner for use in wide-range speed control.

In addition, the frequency of troubles is reduced because the rotating ring is stopped when the prime mover is operating at the rated speed. Particularly at the start-up of the prime mover, the motor driving the rotating ring operates at the rated speed, and therefore the speed governing is simplified and excellent detection characteristics are attained at the time of start-up. Omission of electronic circuit components from the detecting system insures a high dependability.

Figure 5:
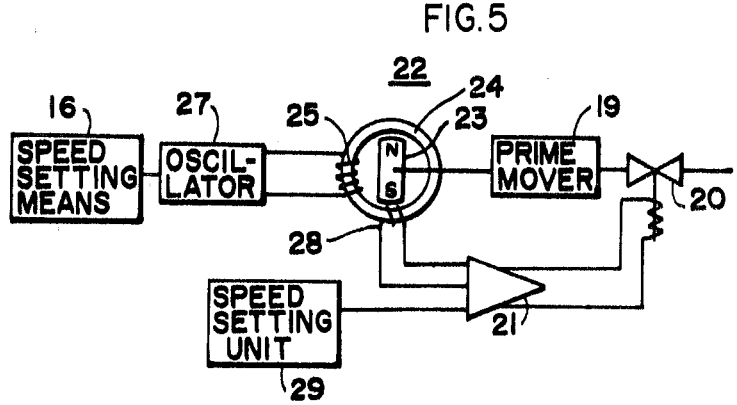
FIG. 5 is schematic diagram of another embodiment of speed controller in accordance with the invention.

Referring now to the embodiment of the invention illustrated in FIG. 5, a permanent magnet or electro-magnet generator is indicated generally at 22 as including a permanent magnet rotor 23 and a stationary stator 24. Rotor 23 is coupled directly to, or electrically synchronized with, prime mover 19 for rotation at a speed corresponding to the speed of the prime mover. A primary winding 25 is wound around stator 24 of generator 22, for energizing the rotating magnetic field of rotor 23, and an output winding 28 is also wound on stator 24.

Primary coil 25 is energized by an oscillator 27 whose frequency varies with the setting of a first speed setting means 16. Winding 28 thus develops a voltage at a frequency corresponding to the difference between the angular velocity of rotor 23 and the angular velocity of the rotating magnetic field, so that the output of winding 28 can be supplied, together with the output of a second speed setting means 29, to a control element, such as a control throttle, 20 for controlling the speed of prime mover 19, the output being provided through an operating means 21.

The arrangement of FIG. 5 operates in a manner which will now be explained. To control the speed of prime mover 19, a command is given through speed setting means 16 as a signal at a reference frequency and in such a manner than the desired value of the speed is $\omega_1$. Oscillator 27 produces a voltage at a frequency $f_0-f_1$, which corresponds to $\omega_0 -\omega_1$ (where $\omega_0$ is a rated speed). Thereby, a rotating magnetic field having an angular velocity of $\omega_0-\omega_1$ is produced in primary winding 25. If, at this time, the speed of prime mover 19 is equal to $\omega_1$, then the relative speed of the rotating magnetic field and the rotor will be $\omega_1 +(\omega_0-\omega_1)=\omega_0$. A voltage at a frequency $f_0$, corresponding to the rated speed $\omega_0$, is produced in secondary or output winding 28.

Operating means 21 discriminates the frequency on the basis of the frequency $f_0$, and derives a voltage $\Delta V$ proportional to the frequency deviation $\Delta f$ from the reference frequency $f_0$. At this time, since $f_0 = 0$, no manipulating signal for varying the output of the prime mover is supplied to throttle 20. Thus, the speed governing system is in equilibrium.

If the speed of prime mover 19 changes to a value $\omega_2 ( \ne \omega_1)$, then the relative speed of the rotating magnetic field and rotor 23 will be $\omega_2 + (\omega_0 - \omega_1) =\omega_0 +\Delta \omega$ (where $\Delta\omega =\omega_2 -\omega_1$). A voltage at a frequency $f_0 + \Delta f (\Delta f = f_2 - f_1)$, corresponding to a $\omega_0 + \omega_1$, is produced in winding 28 on stator 24. The voltage is supplied to operating means 21, and operating means 21 has an output in terms of a voltage $\Delta V_2$ which is proportional to the frequency deviation $\Delta f = f_2 - f_1$. Accordingly, prime mover 19 is regulated by throttle 20 until the speed $\omega_2$ of prime mover 19 equals the preset speed $\omega_1$.

Figure 6:
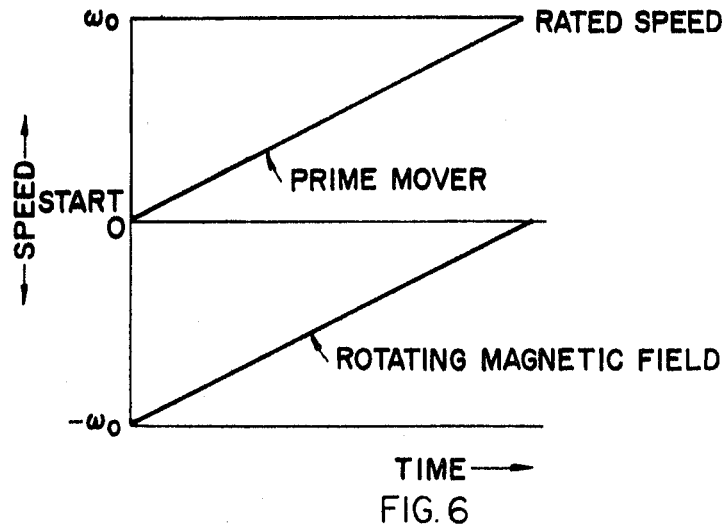
FIG. 6 is a diagram graphically illustrating the characteristic curves corresponding to the operation of the embodiment of the invention shown in FIG. 5.

When prime mover 19 is inoperative, speed setting means 16 should be kept at the setting for the prime mover speed of $\omega = 0$, and the rotating magnetic field is reversed so that $\omega_0 - 0 = \omega_0$. Oscillator 27 generates a voltage of a frequency $f_0$ corresponding to $\omega_0$. When the speed setting means is set to increase the speed of the prime mover, in order to start the prime mover, a deviation in the speed $\Delta \omega$ develops and a voltage of a frequency $f_0 - \Delta f$ is produced in secondary winding 28. Thus, prime mover 19 is regulated for an increase in speed by operating means 21 through throttle 22. When the command signal from speed setting means 16 has attained the rated speed $\omega_0$, the rotating magnetic field stops at a speed of $\omega_0 - \omega_0 = 0$, and the speed of prime mover 19 becomes $\omega_0$ in an equilibrium state. In this state, the rotating magnetic field takes no part in the speed governing, but the governor detects the speed $\omega_0$ of the prime mover, and thus functions exactly in the same way as conventional governors. This is illustrated in the form of characteristic curves in FIG. 6, wherein the speed is plotted on the ordinate and time on the abscissa.

Actually, operating means 21 can control the speed to some extent over a certain range, and can be subjected to a command signal from speed setting means 29. Therefore, it is possible to reduce the speed of the prime mover, for stopping the rotating magnetic field, to a value below $\omega_0$. Thus, the discriminating circuit of the operating means 21 always can be supplied with signals centered around frequency $f_0$, and a high S/N and sensitivity are obtained throughout the whole range from the start-up to the rated speed of operation of prime mover 19.

As distinguished from the arrangement shown in FIG. 2, the arrangement shown in FIG. 5 involves a speed controller in which a rotating magnetic field, with a given reference frequency, is produced on a rotor which revolves in accordance with the speed of the apparatus to be controlled. The rotor is energized through a primary winding on a stationary stator, and a signal comparing the angular velocity of the rotating magnetic field with the speed of the apparatus to be controlled can be derived at a secondary winding on the stator.

Otherwise, the arrangement shown in FIG. 5 operates in the same manner as the arrangement shown in FIG. 2, and has the same advantages.

What is claimed is:

1. A speed controller for prime movers having a control throttle comprising, in combination, a rotary magnet generator including a rotary magnet element and an annular stator element; means coupling one of said elements with the prime mover for rotation by the latter at a speed proportional to that of the prime mover to develop, in said stator element, a voltage at a first frequency corresponding to the speed of said prime mover; control means controlling the control throttle; an output winding on said stator element connected to said control means; and speed setting means operatively coupled to the other of said elements and operable to develop, in said stator element, a voltage at a second frequency corresponding to a speed set by said speed setting means; whereby to develop in said output winding a control voltage at a frequency equal to the difference between said first and second frequencies to control the throttle in accordance with any difference between the speed of said prime mover and the speed set by said speed setting means; said rotary magnet element being coupled with the prime mover; said stator element being non-rotatable; said speed setting means including means developing, in said stator element, a magnetic field rotating at a speed corresponding to the speed set by said speed setting means; said means developing said rotating magnetic field comprising a primary winding wound on said stator element and an oscillator having its output connected to said primary winding; said speed setting means controlling the frequency of said oscillator; said control means comprising frequency discriminating means connected to said output winding; and a speed setting unit connected to said frequency discriminating means.

* * * * *